Dec. 29, 1953 D. R. FEEMSTER ET AL 2,664,014
MECHANISM CONTROL
Filed July 7, 1949 3 Sheets-Sheet 1
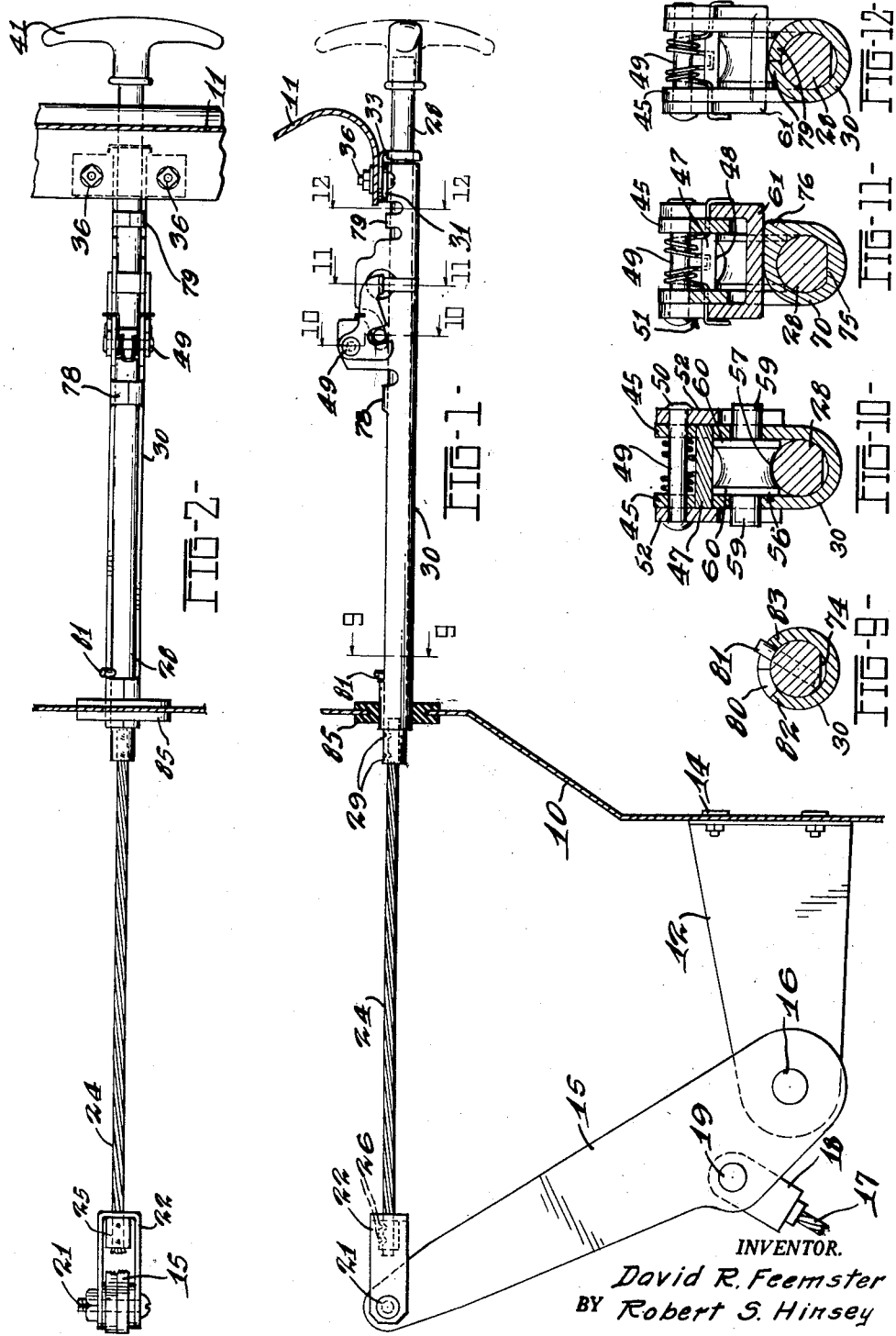
INVENTOR.
David R. Feemster
BY Robert S. Hinsey
Harry O. Ernsberger
ATTY.

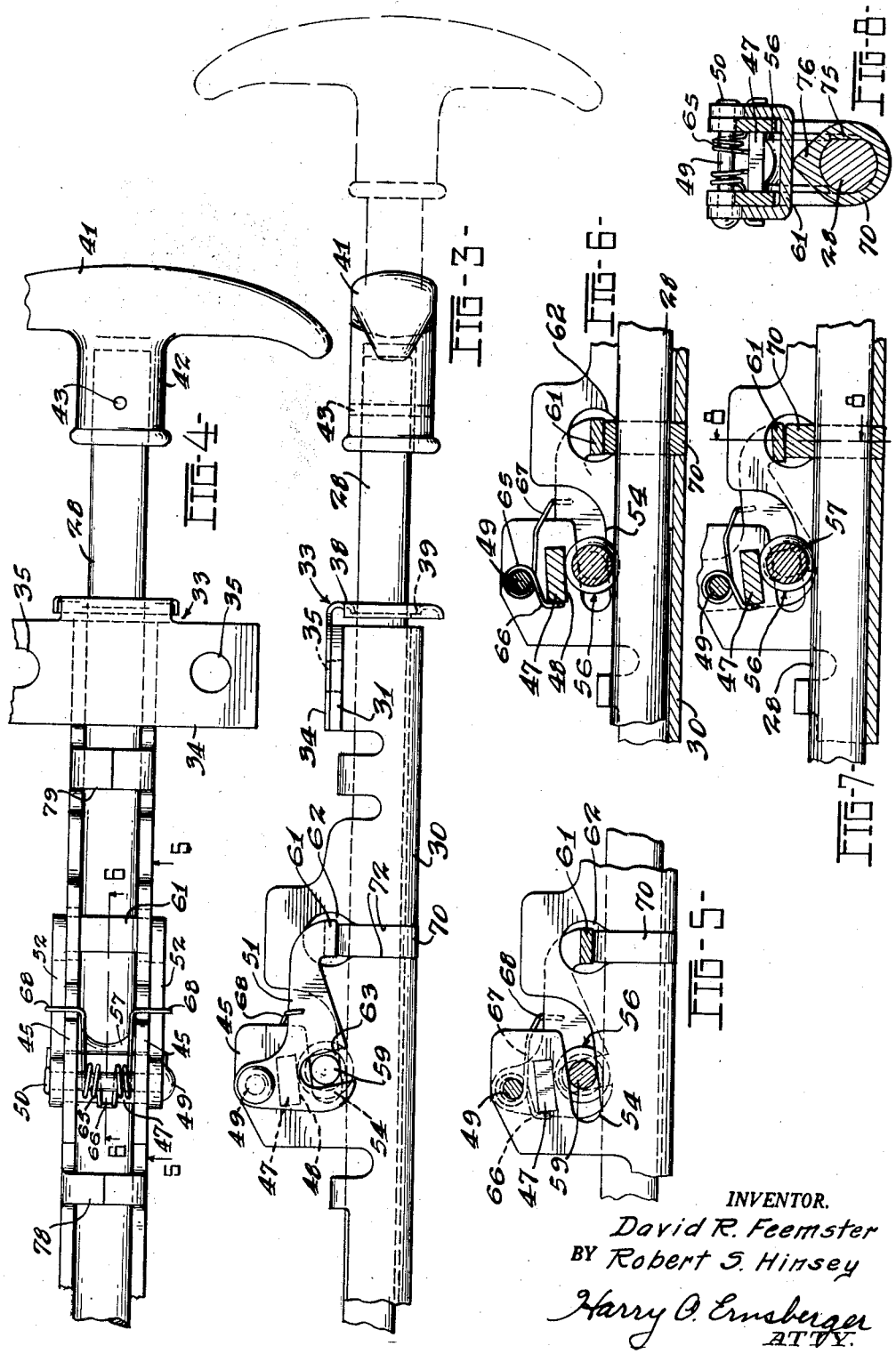

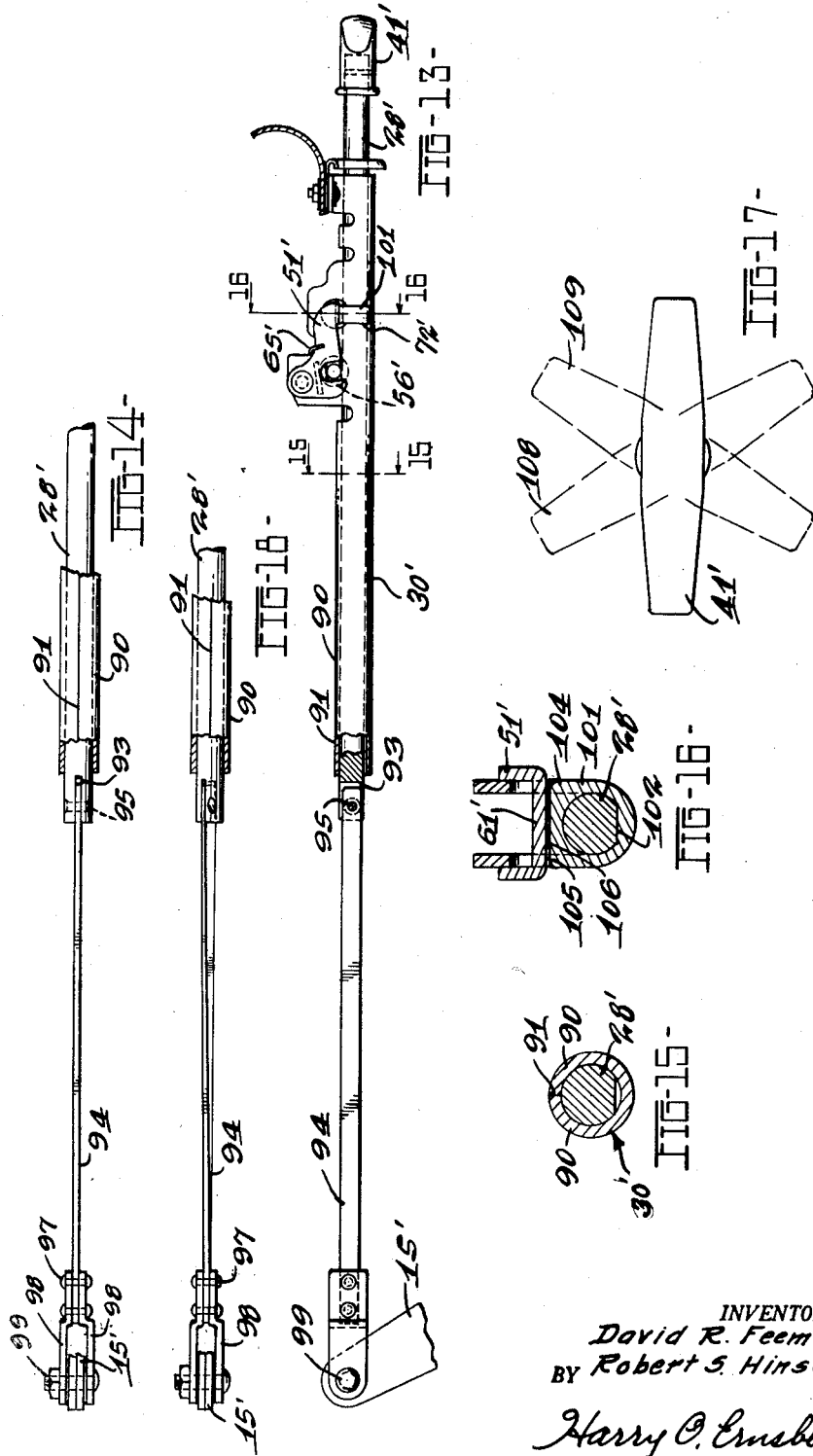

Patented Dec. 29, 1953

2,664,014

UNITED STATES PATENT OFFICE 2,664,014

MECHANISM CONTROL

David R. Feemster and Robert S. Hinsey, Toledo, Ohio, assignors to The Bingham-Herbrand Corporation, Toledo, Ohio, a corporation of Ohio Application July 7, 1949, Serial No. 103,365

15 Claims. (Cl. 74—502)

This invention relates to mechanism actuating or control devices and more especially to apparatus for actuating and controlling the emergency or parking brakes of an automotive vehicle.

The invention contemplates the provision of a longitudinally movable means or mechanism actuating member in combination with a friction clutch means for retaining the longitudinally movable means in adjusted position.

An object of the invention is the provision of a mechanism actuating means embodying a longitudinally movable bar or member adapted to be connected to mechanism to be actuated in conjunction with friction clutch means for retaining the longitudinally movable member in adjusted position, the clutch means and member being so constructed and arranged that rotational movement of the member in any position of longitudinal adjustment effects a release of the clutching means.

Another object of the invention resides in a brake actuating and control means for vehicles, the said means including a longitudinally movable pull bar in combination with a roller type of clutch and resilient means for normally urging the clutch roller into clutching engagement with the pull bar and wherein relative rotational movement of the pull bar operates to release the clutch roller from clutching engagement with the bar.

Another object of the invention is the provision of mechanism actuating means embodying a pull bar and friction roller clutch means for holding the pull bar in any position of longitudinal adjustment, the construction embodying a means for releasing the clutch roller from engagement with the bar through relative rotation of the bar whereby a minimum effort is required to release the clutch means.

A further object of the invention resides in the provision of a pull type brake actuating device for a vehicle embodying a longitudinally movable member and cooperating friction clutch means for retaining the member in any position of longitudinal adjustment, the member being normally resiliently held against rotation in a position to be effectively engaged by the clutch means and whereby partial rotational movement of the member effects a release thereof.

Still a further object of the invention is the provision of a pull bar type of brake actuating means for automotive vehicles in which a roller clutch is adapted to frictionally engage a smooth surface on the bar for retaining the latter in any position of adjustment, the arrangement embodying cam means operable upon rotational movement of the bar for withdrawing the roller clutch from clutching engagement with the bar.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view illustrating an embodiment of the invention as utilized for actuating the parking or emergency brakes of a vehicle, the mechanism being associated with the instrument panel and dashboard of a vehicle;

Figure 2 is a top plan view of the arrangement illustrated in Figure 1;

Figure 3 is an enlarged elevational view showing a portion of the brake actuating mechanism illustrated in Figure 1;

Figure 4 is a top plan view of the structure shown in Figure 3;

Figure 5 is a fragmentary sectional view taken substantially on the line 5—5 of Figure 4;

Figure 6 is a sectional view taken substantially on the line 6—6 of Figure 4;

Figure 7 is a view similar to Figure 6 showing the clutch mechanism in released or declutching position;

Figure 8 is a detail sectional view taken substantially on the line 8—8 of Figure 7;

Figure 9 is an enlarged sectional view taken substantially on the line 9—9 of Figure 1.

Figure 10 is an enlarged vertical sectional view taken substantially on the line 10—10 of Figure 1;

Figure 11 is a vertical sectional view taken substantially on the line 11—11 of Figure 1;

Figure 12 is a vertical sectional view taken substantially on the line 12—12 of Figure 1;

Figure 13 is a view similar to Figure 1 illustrating a modified form of the invention;

Figure 14 is a top plan view partly in section of a portion of the structure shown in Figure 13;

Figure 15 is an enlarged sectional view taken substantially on the line 15—15 of Figure 13;

Figure 16 is an enlarged sectional view taken substantially on the line 16—16 of Figure 13;

Figure 17 is an end view of the manipulating handle illustrating dual clutch releasing positions thereof, and Figure 18 is a view illustrating the relative flexure of the torsion bar or link when the actuating member is rotated to brake release position.

While we have illustrated the forms of the invention as particularly usable for actuating the emergency or parking brakes of an automotive vehicle, it is to be understood that the use of the actuating device of our invention is contemplated with any mechanism wherein the same may be found to be applicable.

Referring to the drawings in detail, the dashboard of a vehicle is indicated at 10 and the instrument panel at 11. The dashboard 10 supports a bracket 12 through the medium of bolts 14, a lever or arm 15 being pivotally connected to the bracket 12 by means of a pivot pin 16. The brake mechanism (not shown) of a vehicle is connected to the arm or lever 15 by means of a cable 17, a clevis 18 and a connecting pin 19, a suitable spring means (not shown) being associated with the vehicle brake mechanism for normally urging the brakes to released position.

Connected to the upper end of the lever or arm 15 by means of a pin 21 is a clevis 22 to which is connected a cable 24 formed of a plurality of steel wires or the like. Connected to the end of the cable 24 is a rectangular block 25 which is fixedly secured to the cable by swaging or indenting portions 26 of the block into the cable 24. The other end of the cable extends into a bore formed in an elongated rod or member 28, portions of the bar being indented as at 29 into engagement with the cable for securely fastening the cable to the rod 28. The rod or member 28 provides a means for actuating or manipulating the brakes by moving the cable or link 24, arm 15 and cable 17.

The rod 28 is mounted in a suitable guide member or support 30 for relative rotational and longitudinally slidable movement, the support 30 being of generally elongated tubular configuration. The member 30 is provided with laterally extending oppositely directed ear portions 31. As particularly shown in Figures 1 through 4, escutcheon member 33 is formed with a horizontal portion 34 adapted to overlie the ear portions 31 of the tube 30, both portions 31 and 34 being provided with registering opening 35 to accommodate bolts 36 for securing an end portion of the member 30 to the instrument panel 11. The escutcheon member 33 is formed with a depending portion 38 which is provided with a circular opening bounded by an inwardly extending flange 39 through which extends the rod 28, the member 38 providing a guide for the rod. The rod or bar 28 is equipped with a manipulating handle 41 which may be of metal, plastic or composition material and which is fashioned with a boss portion 42 bored to accommodate the end portion of rod 28 as particularly shown in Figures 3 and 4. The boss portion 42 is securely connected to the rod by means of a transversely extending pin 43.

The housing member 30 is formed with a pair of parallel wall portions 45 provided with aligned rectangularly shaped openings through which extends a member 47 formed of hardened metal to present a hardened clutch surface 48. The upper portions of walls 45 are formed with aligned circular openings to accommodate a headed pin 49, the opposite end being swaged as at 50 during assembly of the mechanism. Pivotally mounted upon the pin 49 is a clutch actuating bracket or member 51 having portions 52 which lie in parallelism with and adjacent to the walls 45 and having openings through which the pin 49 extends. In this manner the bracket or member 51 is pivotally connected to the wall portions 45 of the housing 30.

The wall portions 45 are formed in a manner providing slots 54, the walls of which are parallel with the plane of the stationary clutch surface 48 of block 47 and are arranged at an acute or wedging angle with respect to the longitudinal axis of the bar 28. A suitable clutch means is provided for frictionally or wedgingly retaining the bar 28 in any position of longitudinal adjustment of the bar. As illustrated the clutch means is in the form of an hourglass-shaped member, roller or spool 56, the curvature of the central portion 57 thereof being of a character to fit the cylindrical surface of bar 28 so that during clutching or wedging engagement of the central arcuate portion of the roller with the bar a full line contact or engagement may be had between these elements. The clutch roller 56 is integrally formed with projecting cylindrical tenons 59 adapted to extend into the slots 54 formed in the walls 45. As particularly shown in Figure 10, the portions of the roller between the curved central section and the tenons 59 are of cylindrical configuration indicated at 60 adapted for engageemnt with the rectangularly shaped block 47 forming an element of the clutch construction. When the clutch roller is in clutching position, the curved surface 57 is in engagement with the bar or rod 28 and the peripheries of portions 60 are in direct engagement with the lower surface of the block 47.

The parallel wall portions of the bracket 51 are joined by a bridge or bight portion 61 which extends through a slot or space 62 formed in the housing or support 30. The walls of the bracket 51 are also formed with slots 63 which are angularly arranged with respect to the slots 54 in the walls 45, the arrangement being particularly illustrated in Figure 3. The tenons 59 on the roller 56 extend through the slots 54 and into the slots 63. A resilient means in the form of a spring 65 has a central or bight portion 66 resting against a wall of the block 47, the spring having parallel leg portions 67 terminating in transversely and oppositely extending portions 68 which overtake and engage intermediate portions of the bracket 51 as particularly shown in Figures 3 and 5. It should be noted that the spring or resilient means 65 is arranged to constantly urge the bracket 51 in a clockwise direction about the axis of the supporting pin 49 thus resiliently urging the roller 56 into wedging engagement between the lower surface of the block 47 and the cylindrical exterior surface of bar 28.

The slot 62 in the support 30 is of a dimension to receive and accommodate a cam 70. The cam member 70 is formed with a bore through which extends the member or rod 28, the rod being relatively slidable through the cam. It should be noted that the lower portion of the rod 28, as shown in Figures 8 through 12 inclusive, has a flat or uniplanar wall 74 for cooperation with a flattened interior portion 75 on the cam 70 forming a non-circular connection between these elements which causes the cam to rotate with the bar 28 when the latter is rotated. It is to be understood that any suitable configuration of cooperating portions of the cam and bar may be utilized which will provide for relative slidable movement therebetween and wherein rotation of the bar causes rotation of the cam for clutch releasing purposes. The cam 70 is formed with a lobe or raised portion 76 adapted for cooperative engagement with the bridge or bight portion 61 of the bracket 51. As indicated in Figure 3, the side walls 72 of slot 62 prevent movement of the cam 70 in the direction of the axis of the rod or member 28 during longitudinal movements of the latter. The slots 63 in the parallel walls 52 are in lateral or transverse alignment so that the clutch roller 57 will be engaged with bar 28 in a direction at right angles to the longitudinal axis of bar 28 so that the curved central portion of the clutch roller 56 will have a full line engagement with the upper cylindrical surface of the rod 28. In this manner the rod 28 may be held in adjusted position through the medium of an adequate frictional engagement of the clutch roller with the bar. The member 28 and clutch roller 56 may be hardened to minimize wear of these elements and assure long life of the clutch means.

The bar 28 is suitably guided in its longitudinal movements by the housing or support 30, the latter being preferably formed with spaced pairs of ears 78 and 79 which are bent around the bar 28 so as to provide a suitable guiding means to slidably retain the bar 28 in proper position in the support 30. The spaced ears 78 and 79 are positioned so as to provide adequate guiding support for the bar 28 when the same is withdrawn or extended to brake setting position, as for example, the position illustrated in dotted lines in Figure 3.

A suitable means in the form of a flexible wire cable 24 connects the lever 15 with the actuating bar 28, and during assembly of the mechanism the cable is given an initial twist so as to establish a torque moment in a direction to normally and resiliently urge the bar 28 and handle 41 to an initial position of relative rotation. The upper portion of the support 30 is provided with a longitudinal slot 80 which provides clearance to accommodate an abutment or stop means in the form of a pin 81 driven into a transverse opening in the bar 28. The edge walls 82 and 83 of the support 30 defining the slot 80 provide limiting means for determining the extent of the relative rotative movement of the bar 28. This arrangement of pin and slot construction is illustrated in Figures 2 and 9. As particularly shown in Figure 9, the pin 81 is normally in engagement with the edge 83 being urged to this position under the influence of the initial twist or torque set up in the cable 24. The supporting means 30 extends through a rubber grommet 85 which is fitted into a suitable opening in the dashboard 10.

The operation of this form of the invention is as follows: When the brakes or braking mechanism of the vehicle are in released position, the lever 15, cable 24 and actuating bar 28 are in the position illustrated in Figures 1 and 2, these elements being urged to this position under the influence of spring means (not shown) associated with the brake mechanism. When it is desired to effect a setting of the vehicle brake mechanism, the operator or user grasps the handle member 41 and exerts an outward pull or force longitudinally of the axis of the bar 28 in a right hand direction as viewed in Figures 1 through 4 inclusive sliding the bar relatively to the support 30. During this slidable movement of bar 28, the latter passes through the opening in the cam 70 without causing any relative movement of the cam. The spring 65 engaging the bracket 51 continuously urges the clutch means or roller 56 into a wedging or clutching position between the lower face of the block 47 and the curved cylindrical surface of the bar 28. Thus at the instant the operator or user releases his grip upon the handle 41, the clutch roller 57 being wedged between the block 47 and the cylindrical surface of the bar 28 under the influence of the spring 65, a clutching engagement is effected for securely and frictionally holding or retaining the bar 28 in "brake setting" position. The outward or extended movement of bar 28 swings the lever 15 clockwise about the axis of the pivot pin 16 as viewed in Figure 1 which movement is transmitted to the cable or means 17 connected to the brake mechanism (not shown) to actuate the latter.

When it is desired to release the brakes, the operator or user grasps the handle 41 and rotates the handle and bar 28 in a counter-clockwise direction as viewed in Figures 8 through 12 inclusive, the rotation of the bar rotating the cam 70 from the position shown in Figure 11 to the position shown in Figure 8 during which movement the lobe 76 of the cam engages the bridge or bight portion 61 of the bracket 51 causing the latter to pivot in a clockwise direction as viewed in Figures 1, 3, 6 and 7 to withdraw the clutch means or roller 57 from wedging engagement with block 47 and bar 28. Figure 6 illustrates the clutch means and bracket 51 in "brake setting" position with the roller 56 retaining the bar 28 against retractive movement in a right hand direction. Figure 7 illustrates the position of these elements with the clutch roller 56 in released position. After relative rotation of the bar 28 to brake releasing position has taken place, the operator may then exert an inward longitudinal force upon the bar 28 to move the latter to brake released position, which movement is also facilitated by reason of the spring means (not shown) associated with the brake mechanism tending to move the brakes to release position.

It should be noted that through the use of a bar 28 having a smooth uninterrupted clutching surface, the clutch means is adapted for engagement with the smooth surface of the bar and is instantly effective to hold the bar in any of an infinite number of positions.

Figures 13 through 18 inclusive illustrate a modified form of the invention. As illustrated in the drawings the support or guide 30' is similar in construction to the support 30 except that the walls 90 are formed into abutting relation as shown in section in Figure 15, the edges of the walls meeting as at 91. The clutch mechanism in this form of invention is the same as that in the previously described form of the invention as shown in detail in Figures 5, 6 and 7 and includes a clutching means or roller 56', bracket or clutch controlling member 51' and a spring 65' urging the roller toward clutching engagement with actuating bar or member 28'.

In this form of the invention, the inner end of bar 28' is formed with a slot 93 to snugly accommodate one end of a strip 94 of tempered or spring steel or the like, the strip being pivotally connected to the end portion of the bar 28' by means of a pin or rivet 95. Secured to the other end portion of the strip 94 by means or rivets 97 is a pair of members 98 which together form a clevis construction adapted to be connected to a lever 15' by means of a pin or bolt 99. The lever 15' is connected to the brake mechanism (not shown) of a vehicle in the conventional manner.

The strip or link 94 is preferably formed of rectangular cross section and is comparatively thin so that the same may be flexed or twisted on a longitudinal axis to a substantial degree as shown in Figure 18 without exceeding the elastic limit, so that when such torque or flexure stresses are removed, the strip 94 will return to its initial position as shown in Figure 14. It is found that a strip of spring steel of about one thirty-second of an inch in thickness and of a width sufficient to withstand the longitudinal or tension stresses in effecting a setting of the vehicle brakes functions satisfactorily. It is to be understood that a strip of material of other configuration in cross section may be used so long as the strip has sufficient initial resiliency and flexibility as to insure its return to a predetermined position after torsional stresses are removed. The connecting strip or link 94 being endowed with the characteristic of flexibly resisting torque, serves to resiliently maintain the bar in one relative position of rotation.

This form of the invention is inclusive of a cam 101 which is fitted in the slot 72' formed in the support 30'. The manipulating bar 28' has a flattened surface 102 and the interior wall of the cam 101 is formed with a flattened portion arranged to coincide with the flat portion 102 as particularly shown in Figure 16. The cam 101 is formed with two lobes 104 and 105 as shown in Figure 16. A clearance space 106 is provided between the cam and the bridge portion 61' of the bracket 51' so that when the bar 28' is in a neutral position of rotation, either lobe 104 or 105 is in engagement with the bridge portion 61'.

A setting of the vehicle brakes is effected by exerting a longitudinal pull or force on bar 28' to slide the same along the support 30' in the same manner as the form of the invention shown in Figures 1 through 12, the clutch roller 56' wedgingly retaining the bar 28' in adjusted position. When it is desired to release the brake mechanism, this may be accomplished by partial rotation of the bar 28' in either a right or left hand direction of rotation to move either lobe 104 or 105 into engagement with the bridge portion 61' to oscillate the bracket 51' and thus withdraw the clutch roller 56' from clutching engagement with the bar 28'. Thus if the handle 41' is moved in a clockwise direction as indicated in dotted lines at 108 in Figure 17, the lobe 105 will engage and actuate bracket 51' to release the clutch. If the handle 41' is moved in a counterclockwise direction to the position indicated in dotted lines at 109 in Figure 17 the lobe 104 of the cam is rotated into engagement with the bridge member 61' to actuate the bracket 51' for releasing the clutch. The operator, upon release of the clutch 56' in the manner above described, then slides the bar 28' in a left hand direction as viewed in Figure 13 which movement is communicated through the strip 94 to the lever 15' to release the brake mechanism. Thus in this form of the invention, the normal or neutral unflexed position of the strip or link 94 maintains the bar 28' in such neutral position and resiliently resists relative rotation of the bar 28'. In this modified form a positive abutment or stop means is unnecessary to normally maintain the bar 28' and cam 101 in a position to render the clutch roller 56' effective to retain the bar in brake set position.

It is apparent that, within the scope of the invention, modifications and different arrangements may be made other than is herein disclosed, and the present disclosure is illustrative merely, the invention comprehending all variations thereof.

We claim:

1. A mechanism control device including, in combination, a support; a member associated with said support and adapted for longitudinal and rotatable movement with respect thereto; a clutch roller arranged for frictional clutching engagement with said member and said support; means associated with said member for releasing said clutch roller from clutching engagement with said member; said clutch roller releasing means being arranged to be actuated by relative rotative movement of said member.

2. A mechanism control device including, in combination, a member supported for relative longitudinal and rotatable movement; a clutch roller arranged for frictional clutching engagement with said member; means associated with said member for releasing said clutch roller from clutching engagement with said member; said clutch roller releasing means being rendered effective to release said clutch roller from clutching engagement with said member upon relative rotative movement of said member.

3. A mechanism control device including, in combination, a support having a clutch surface associated therewith; a member associated with said support and adapted for longitudinal and rotatable movement with respect thereto; said member being formed with a cylindrically shaped surface; clutch means including a roller arranged for clutching engagement with the cylindrically shaped surface of said member and the clutch surface associated with said support to retain the member in adjusted position; cam means associated with said member for disengaging said clutch roller from clutching engagement with said member, said cam means being arranged to be actuated by rotation of said member with respect to the support.

4. A mechanism control device including, in combination, a support having an abutment associated therewith; a member mounted upon the support and adapted for longitudinal and rotatable movement with respect thereto; said member being formed with a partial cylindrical configuration; a manipulating handle portion associated with said member; clutch means arranged for clutching engagement with a surface of said member and said abutment; cam means associated with said member for disengaging said clutch means from said member and said abutment, said cam means being arranged to be actuated by relative rotation of said member with respect to the support.

5. A mechanism control device including, in combination, a support; a rod mounted upon said support and adapted for slidable and rotatable movement relative thereto; a clutch roller arranged for frictional engagement with a surface of said rod for retaining the latter in adjusted position; clutch releasing means associated with said rod; said clutch releasing means being rendered effective to disengage the clutch roller from said rod upon rotative movement of said rod.

6. A mechanism control device including, in combination, a support; a rod mounted upon said support and adapted for slidable and rotatable movement relative thereto; friction clutch means including a roller having a peripheral concave surface arranged for engagement with a surface of said rod for retaining the latter in adjusted position; clutch releasing means including a cam associated with said rod; said clutch releasing cam being arranged to disengage the clutch roller from the rod upon rotation of said rod relative to said support.

7. A mechanism control device including, in combination, a support; a rod mounted on said support; said rod being arranged for slidable and rotative movement relative to said support; a friction clutch engageable with said rod for retaining the latter in adjusted position; means associated with said rod for effecting release of the clutch upon rotative movement of said rod, and means including an elongated torsionally yieldable element connected to said rod for resisting rotational movement of said rod in either direction relative to said support.

8. A mechanism control device including, in combination, a support having an abutment; a member associated with said support; said member being arranged for longitudinal and rotative movements relative to said support; a friction clutch engageable with said member and said abutment for retaining the member in adjusted position; means associated with said member for effecting release of the clutch upon rotative movement of said member, and means including a torsionally flexible element for normally retaining said member in one position of rotation.

9. A mechanism control device including, in combination, a support; a member having a cylindrically shaped exterior surface associated with said support; said member being arranged for longitudinal and rotative movement relative to said support; a clutch roller having a curved configuration to fit the cylindrically shaped surface; said clutch roller being arranged for engagement with said member for retaining the latter in longitudinally adjusted position; means associated with and actuated by said member for effecting release of the clutch roller upon rotative movement of said member, and means for normally retaining said member in one relative position of rotation.

10. A mechanism control device including, in combination, a support; a member having a smooth surface portion of curved cross section associated with said support; said member being arranged for longitudinal and rotatable movements relative to said support; a clutch means including a roller having a curved exterior configuration adapted to engage the curved surface of said member to frictionally retain the member in longitudinally adjusted position; resilient means normally urging said roller into engagement with said member; means associated with and actuated by said member for effecting release of the roller from frictional engagement with the member upon rotative movement of the member; and means for resiliently retaining the member in one relative position of rotation.

11. A mechanism control device including, in combination, a tubular support; a rod mounted in said tubular support and arranged for slidable and rotative movements relative thereto; means including a torsionally yieldable element connecting the rod to mechanism to be actuated; said connecting element normally and resiliently retaining said rod to one position of rotation; friction clutch means including a roller engageable with a surface of the rod for retaining the latter in longitudinally adjusted positions; cam means associated with said rod for releasing said clutch means, said clutch releasing cam means being actuated to clutch releasing position by rotative movement of said rod.

12. A mechanism control device including, in combination, a member supported for relative longitudinal and rotative movements; means for connecting said member to mechanism to be controlled including a torsionally flexible element; clutch means engageable with said member adapted to retain the member in a longitudinally adjusted position; clutch releasing means operable to release said clutch means from clutching engagement with said member upon rotative movement of said member in either direction of rotation; said torsionally flexible element being arranged to resiliently maintain said member in a position whereby said clutch means is normally effective for clutching engagement with said member.

13. A mechanism control device including, in combination, a member supported for relative longitudinal and rotative movements; means for connecting said member to mechanism to be controlled including a torsionally flexible element of rectangular cross section; clutch means engageable with said member adapted to retain the member in a longitudinally adjusted position; clutch releasing means for releasing said clutch means from clutching engagement with said member operable upon rotative movement of said member; said flexible element being torsionally yieldable to resiliently maintain said member in a position whereby said clutch means is normally effective for clutching engagement with said member.

14. A mechanism control device including, in combination, a member supported for relative longitudinal and rotative movements; means for connecting said member to mechanism to be controlled including a torsionally flexible element; clutch means engageable with said member adapted to retain the member in a longitudinally adjusted position; clutch releasing means including a cam associated with said member operable to release said clutch means from clutching engagement with the member upon rotative movement of said member in either direction of rotation; said flexible element being torsionally yieldable to resiliently maintain said member in a position whereby said clutch means is normally effective for clutching engagement with said member.

15. A mechanism control device including, in combination, a support having an abutment, a member associated with said support, said member being arranged for longitudinal and rotative movements relative to said support, a friction clutch engageable with said member and said abutment for retaining the member in adjusted position, means associated with said member for effecting release of the clutch upon rotative movement of said member, a torsionally flexible element having operative connection with said member normally retaining said member in one position of rotation, said element being substantially coaxial with said member.

DAVID R. FEEMSTER.
ROBERT S. HINSEY.

References Cited in the file of this patent

UNITED STATES PATENTS

| Number | Name | Date |
|---|---|---|
| 1,222,915 | Anderson | Apr. 17, 1917 |
| 1,717,948 | Stokes | June 18, 1929 |
| 1,719,530 | Bovey | July 2, 1929 |
| 2,089,586 | Strobridge | Aug. 10, 1937 |
| 2,141,266 | Dickerson | Dec. 27, 1938 |
| 2,170,900 | Jandus et al. | Aug. 29, 1939 |
| 2,205,987 | McCarthy | June 25, 1940 |
| 2,266,058 | McCarthy | Dec. 16, 1941 |
| 2,408,446 | Ralston | Oct. 1, 1946 |
| 2,429,383 | Arens | Oct. 21, 1947 |
| 2,443,697 | Smith | June 22, 1948 |